Feb. 6, 1945. H. W. THOMAS 2,368,689
SCREEN OF COMPOSITE MATERIAL
Original Filed March 16, 1940  2 Sheets-Sheet 1

INVENTOR.
Harry W. Thomas
BY
ATTORNEY

Feb. 6, 1945. H. W. THOMAS 2,368,689
SCREEN OF COMPOSITE MATERIAL
Original Filed March 16, 1940  2 Sheets-Sheet 2
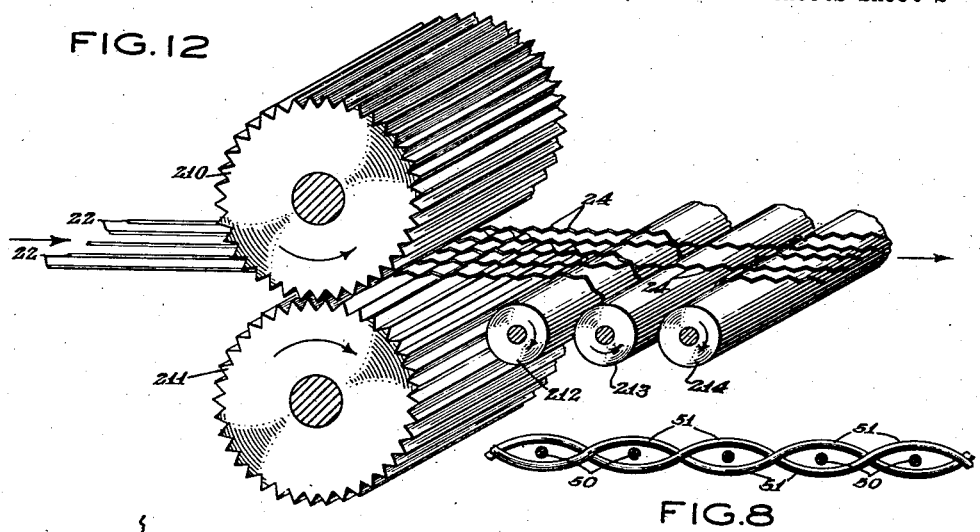
FIG.12
FIG.8
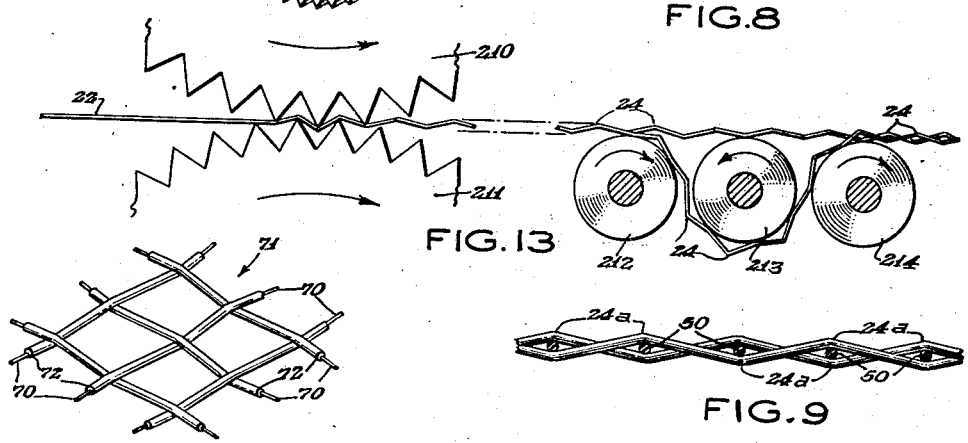
FIG.13
FIG.9
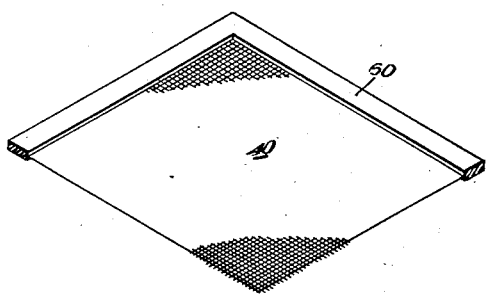
FIG.10
FIG.11
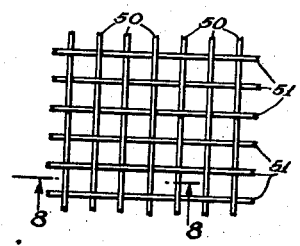
FIG.7
INVENTOR.
Harry W. Thomas
BY Samuel Ostrolenk
ATTORNEY.

Patented Feb. 6, 1945

2,368,689

UNITED STATES PATENT OFFICE 2,368,689

SCREEN OF COMPOSITE MATERIAL

Harry W. Thomas, Miami Beach, Fla.

Original application March 16, 1940, Serial No. 324,393. Divided and this application May 2, 1942, Serial No. 441,525

5 Claims. (Cl. 139—425)

This invention is a division of my application Serial No. 324,393, which was filed on March 16, 1940, and which in turn was a continuation in part of my application Serial No. 265,114, filed March 31, 1939, and relates to woven mesh, preferably reticular material composed primarily of metallic wires covered by thermoplastic, synthetic resins and to a method of making such material, and is more particularly related to an open mesh, flexible, elastic, resilient and structurally strong screen cloth composed primarily of such material with permanent crimps, corrugations or irregularities arranged in each of the wires in order to provide a self-adjusting, positioning element whereby the regularity of the mesh may be maintained under all conditions of use.

Essentially, my invention consists of a screen woven of monofil rods which in turn are composed of a central metallic wire core covered by a thermoplastic synthetic resin. Preferably, the wire is sufficiently thin in relation to the thickness of the covering so that the properties of the thermoplastic synthetic resin or similar material are paramount. In such cases the elasticity of the resinous material, its resistance to corrosion, its strength and its wearing qualities may be utilized even though the base material in each of the rods is a metallic wire.

In accordance with my present invention, screen material, preferably reticular in form, may be made from such wires covered with non-metallic organic and inorganic material which are substantially non-conductive with respect to heat or electricity and are moisture resistant, are not affected by common acids and alkalis and are non-oxidizable, weather resistant, and which may be either transparent, translucent, opaque or colored.

The covering or outside material may be composed wholly of synthetic, polymerization products such as vinyl resins, and they may be formed from resins such as aldehyde condensation products and even the alkyd resins and even cellulose derivatives including cellulose nitrate, cellulose acetate and cellulose ethers such as ethyl or benzyl cellulose.

One of the commercially prepared materials readily adaptable for use in connection with the present invention is the synthetic resin now available known as nylon, and the invention will hereinafter be specifically described as embodying the use of nylon, although it must be understood that nylon is set forth in this specification as an example of the various other materials herein defined which may be used for the purpose.

Nylon itself is the generic name for the entire class of artificial fiber forming materials known as linear condensation polyamides. These polyamides may be derived from polymerizable mono-aminomonocarboxylic acids and their amide forming derivatives as well as from the reaction of suitable diamines with suitable dicarboxylic acids or amide forming derivatives of dibasic dicarboxylic acids.

While nylon therefore is a designation for a generic class of materials and while this material will hereinafter be referred to generically in this description, it must be understood that any similar thermo-plastic synthetic, non-metallic organic material may be utilized in the same manner for the same purposes.

For purposes of the present invention, I prefer to use the nylon covering material as a homogenous coating to form a single solid rod rather than as a multi-filament fiber, since I rely for the operation of my invention upon the inherent elasticity and self-supporting self-setting characteristics of the nylon material.

While organic material, such as nylon is preferred, flexible films and filaments from suitable gels of inorganic materials, including alsifilm and clays, of which bentonite is an example, may be utilized.

In accordance with one form of my present invention, the nylon covered rods are woven in any suitable manner to produce an open mesh screen cloth. This screen cloth has a warp and weft denier and count usual in wire screen cloth generally manufactured for insect and dust excluding purposes. The mesh material thus created is then subjected to a heat treatment for setting the strands in the proper position. While I have illustrated my invention as an open mesh screen cloth, it will be apparent that my composite material may be used for other purposes, as for instance to form insulated electrically conductive wires to be incorporated to cables.

The heat treatment forms permanent crimps in the strands without fusing the crossed mono-fil rods together so that each of the rods of the resulting screen cloth has a permanent hill and dale formation with the warp rods and the weft rods contacting each other at their dale portions or at the troughs of the corrugations. That is, the warp and weft rods are complementarily crimped so as to resiliently maintain each of the rods in the predetermined permanent position.

In order to avoid any possibility of the composite rods returning or tending to return to their original uncrimped position, the woven screen may immediately after the heating process which results in the crimping above mentioned be cooled to help fix the strands in their crimped position.

The corrugated, crimped or hill and dale formation of each of the rods is fixed. The synthetic, non-metallic, organic material such as nylon utilized for the formation of my screen is of such elasticity that even though the mono-fil rods are tensioned in a manner tending to straighten out the crimps, upon release of the tension, the rods will immediately resume their corrugated shape.

In this manner, the openings of the meshes are of permanent size and even though the rods may be deformed by pressure against the screen or even by the insertion or forcing of large objects into or through the mesh openings, nevertheless upon the removal of such tensioning or deforming force, the rods will immediately resume their crimped condition and complementary crimps in each of the rods in their tendency to slide into registry with each other will restore the rods to their original position.

In all of these constructions a useful object of my invention is that the basic metallic wire material be sufficiently thin with respect to the diameter of the composite rod so that the completed rods will have substantially the properties of the nyon with respect to resistance to corrosion, ability to be given a specific shape, elastic recovery from deformation while at the same time it has a supporting or foundation wire member.

An important object of this invention, therefore, is the formation of a physically strong resilient and yet flexible open mesh screen cloth formed of wire covered by synthetic, non-metallic, organic material which is thermoplastic.

Still another object of the present invention is the formation of a screen cloth of the type above described from a series of rods made of metallic wire covered by non-metallic, organic or inorganic, synthetic material, each of the rods being complementarily crimped at their intersection with intersecting rods in order to provide for a resilient predetermined positioning element for each of the rods.

Still another object of the present invention is in a screen made from wire covered by a thermoplastic, synthetic, organic or inorganic, non-metallic material to provide a series of crimps in each of the rods, each of the crimps being made at such an angle that the crimp, when under tension owing to tension upon the strand, may be straightened out without going beyond the elastic limit of the strand so that upon relaxation of tension upon the strand, the crimp will return to its original form.

The screen cloth of my invention may thus be used wherever a strong, resilient, flexible screen is desirable.

One of the important elements to be noted is that by the use of a rod having metallic wire core and a covering which is homogeneous rather than formed of mono-fil multi-filament strands, the intention here is to produce not a flexible cloth suitable for wearing apparel but a screen cloth having the physical and mechanical characteristics above described and necessary to the proper functioning of a screen.

Another object of the present invention is to provide an open mesh screen cloth composed of permanently set crimped metallic wires covered and held in crimped formation by thermoplastic homogeneous resilient covering material.

Other and further important objects of the present invention will in part be apparent and in part pointed out in the following description and drawings, in which:

Figure 7 is a plan view of a screen cloth woven from two sets of uncrimped rods of nylon.

Figure 8 is a cross-sectional view taken on line 8—8 of Figure 7 showing the relationship of the woven rods to each other before the heat treatment.

Figure 9 is a view corresponding to that of Figure 8 showing the condition of the rods after the heat treatment.

Figure 10 is a view in perspective showing a modified form of screen cloth comprising metallic wires covered with nylon and made in accordance with the present invention.

Figure 11 is a view in perspective showing a screen cloth having the form of Figures 6 or 9 and bound at the edges.

Figure 12 is a view in perspective showing modified crimping rolls and apparatus.

Figure 13 is a side elevation of the crimping rolls and apparatus of Figure 12.

The formation of a screen of my wire covered material follows generally the principles set forth in my application Serial No. 324,393, filed March 16, 1940. For this purpose, the processes described with respect to the formation of my novel screen composed of ordinary nylon material are applicable to the formation of a screen which is constructed of wire covered by nylon.

Accordingly, in Figures 1 to 9 and 11 to 13 I have shown the ordinary processes and formations.

In Figure 10 I have shown the formation of a screen of the form of my present invention by means of the processes above set forth.

As shown in Figure 10, employing any well known process such as the extrusion process used in coating wire with rubber, I coat a metallic wire 70 with a thermosetting or thermoplastic synthetic resin such as nylon 72. Preferably, the wire 70 is of such diameter with relation to the coating and has such properties and proportions to the coating that the coating material property of flexibility when the material is set predominates.

Figure 1:
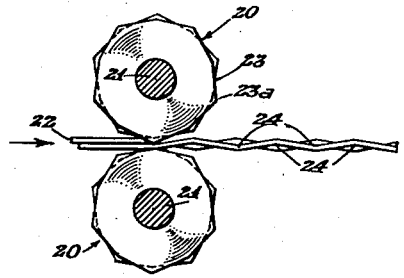
Figure 1 is a side view partly in cross-section of crimping rolls for pre-crimping rods of nylon for use in the present invention.
Figure 2:
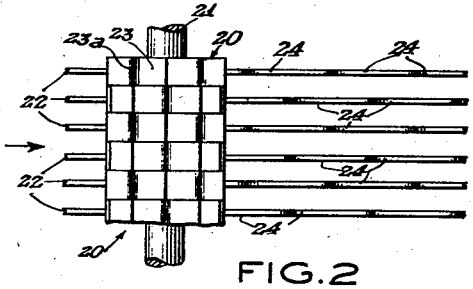
Figure 2 is a top view of the crimping roll of covered metallic wire of Figure 1 showing the crimping of the rods of nylon.
Figure 3:
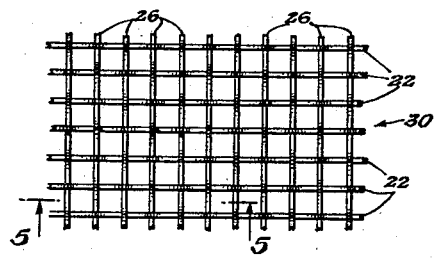
Figure 3 is a plan view of a screen cloth woven from the nylon covered metallic wire of Figures 1 and 2.

Referring now to Figures 1 and 2, I have here shown an apparatus wherein the nylon covered monofils are pre-crimped before being woven into the screen of Figure 3.

A pair of cooperating crimping rolls 20 are rotatably mounted upon their shafts 21 and driven from any suitable power source. The monofils 22 are unreeled from a series of spools suitably mounted in spaced relation to each other or are drawn from any other source in any suitable manner and passed between the crimping rolls 20—20.

The crimping rolls comprise angular projections 23a and angular recess 23 of either roll will cooperate with an angular projection 23a of the opposite roll.

The passing of the monofils in spaced relation through the pre-crimping rolls produces a series of crimps 24—24 in each of the monofils. The crimps alternate in direction, that is, crests and troughs or hills and dales follow each other in each of the monofils 22.

An individual crimping wheel may be provided for each rod. Or the crimping roll may consist of a series of individual wheels bound together upon a single shaft.

It is important for the subsequent weaving operation that the hill and dale locations in adjacent rods be staggered with relation to each other and, accordingly, as seen in Figures 1 and 2, each of the crimping rolls for each individual rod is so arranged as to produce this staggered effect.

Where it is desired to use corrugating rols where no special provision is required in the corrugating or crimping roll itself for the production of alternating crimps in adjacent monofils, then an adjustment such as that shown in Figures 12 and 13 is required.

In Figures 12 and 13, the individual monofils 22 are led between crimping or corrugating rolls 210 and 211 which, as will be seen, are single continuous uniform meshing rolls. The monofils 22 after they emerge from these rolls are crimped at 24 in the manner above described.

During the crimping operation heat may be applied either from within the rolls or to the rolls or the monofils in order to obtain the crimp or set desired.

However, by the use of rolls of the type 210 and 211, the crimps in adjacent monofils are in corresponding relation with respect to each other.

It is important as above pointed out, however, that the crimps in adjacent monofils be staggered with relation to each other.

One method which I have found feasible in producing this result is to give alternate monofils an added travel so that by the lengthening of the path of travel in a predetermined manner, the crimps in adjacent rods may become staggered with relation to each other.

Accordingly, as seen in Figures 12 and 13, alternate monofils 22 having the crimps 24 are passed under the roller 213. Since these alternate monofils are guided by the rolls 212 and 214, they are returned to their original plane after having been passed out of the original plane of the web. The path described by the alternate monofils in travelling beneath the roll 213 is of such length that after these alternate monofils emerge from beneath the roll 213 and pass over the roll 214, the crimps in these monofils are staggered with relation to the crimps in the remaining monofils which have not been passed beneath the roll 213. In this manner, the staggered relation of the crimps in alternate monofils may be obtained and further operations in accordance with the description hereinabove and hereinafter set forth may then be performed.

In a suitable case, pressure alone of a high order may be sufficient to obtain the crimping desired, although heat may be applied in any suitable manner to or within the crimping rolls in order to ensure that the crimps within the nylon monofils will assume a permanent form.

The monofils may, if desired, be rolled up on spools immediately after the crimping operation takes place and thereafter the pre-crimped material may be utilized for the weaving of the screen of Figure 3. Or the nylon covered monofils 22 may, as is seen in Figure 2, be passed in spaced relation to each other through the crimping roll and thence directly onto the loom or other weaving device where the rods of Figure 2 may form the warp of the woven screen.

The weft monofils 26 of Figure 3 may be woven through the warp monofils in any suitable manner as, for instance, by means of a shuttle. Owing to the elasticity imparted to the monofil by the predominating nylon covering, the pre-crimped nylon covered monofils may be wound up on a bobbin without destroying the crimp. The weft monofils 26 can, if desired, be tensioned during the weaving operation to straighten out the corrugations therein but immediately upon release of the tension, the troughs or dales of the crimps will register with complementary troughs or dales in the crimps of the warp monofils.

Figure 5:
Figure 5 is a cross-sectional view taken on line 5—5 of Figure 3 showing the condition of the rods of the screen cloth of Figure 3 before the thermal fixing operation.

After the screen of Figure 3 is woven with the precrimped monofils shown in Figure 2, the monofils thereof may be in loose relation to each other as shown in Figure 5. That is, the crimps 24 are in such relation that should the meshes of the screen be displaced, the elasticity of the screen itself and the resilience of the crimp would tend to drive the mesh back into its original position. But owing to the looseness necessarily inherent in the original weave, this tendency, while it does exist, will nevertheless not be as effective as if the weave were tight and as if the monofils were in close frictional relation with respect to each other.

Figure 4:
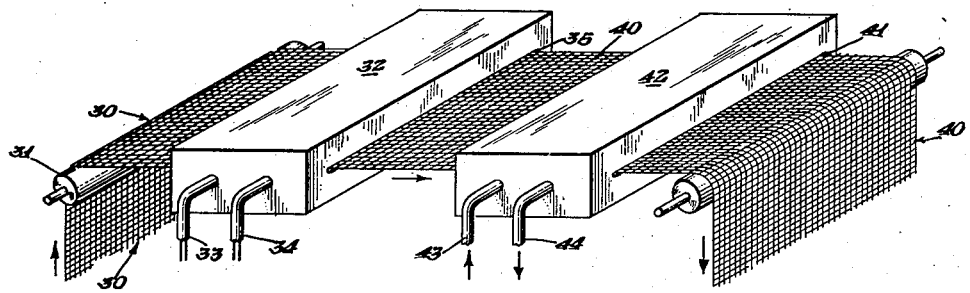
Figure 4 is a view in perspective showing the screen cloth of Figure 3 being drawn through the heating and cooling apparatus for thermally fixing the monofil rods of the screen of Figure 3 in their desired position.

In order to tighten the monofils and in order to cause each of the crimps in the monofils to adopt a permanent set with relation to the complementary crimps of intersecting strands with which they happen, in the woven screen cloth, to be related, I then pass the woven screen cloth of Figure 3 through the heating and cooling apparatus shown in Figure 4. That is, the originally woven screen cloth 30 is passed in any suitable manner over any suitable guide rollers, such as guide roll 31, through a heating chamber 32.

In order that the tight frictional set should be obtained in this manner, the woven screen cloth made from the precrimped monofils should be subjected to heat in the manner herein described while the cloth is in a taut tension position. In order to produce this close frictional set, it is necessary that the material be drawn by the application of tension toward this close setting position. When the precrimped material is thus passed through the heating chamber while taut, the crimps may be adjusted or even reformed to produce the close frictional set above described provided the subsequent cooling operation is immediately applied while the material is still in tension.

The heating chamber may be operated in any suitable manner and by any suitable heating means, the time and temperature of which can be controlled. Various heating means can be applied, including steam, hot air or gases, or any standard electric heating coil may be used.

Thus where steam or hot air or hot gases of various kinds are to be used for the heat treatment, the heat chamber 32 comprises an inflowing duct 33 through which the hot steam, hot air or other heated gases may be forced, the said duct communicating with either heating coils within the heating chamber 32 or with tubes or other means having direct openings directed upon the screen fabric to subject the fabric to the direct influence of the heated fluid.

A suitable exhaust duct 34 may be provided at any appropriate portion of the heat chamber 32.

Figure 6:
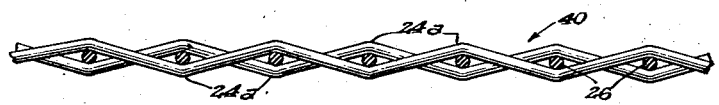
Figure 6 is a view corresponding to that of Figure 5 showing the condition of the rod after the fixing operation.

After the screen fabric emerges from the passage 35 of the heating chamber 32, it is in the form of the final screening material 40 of Figure 6. It, when cooled, acquires the permanent set which creates a tight frictional fit between the monofils in the manner shown in Figure 6.

The monofils have, by reason of the preponderance of the nylon covering material with respect to the relatively thin core of metallic wire, by the heat treatment process, virtually been caused to flow about each other without fusing with each other and have adopted a permanent crimp or set specifically with relation to each other which now resiliently resists any displacement of one rod with respect to an intersecting rod, and by reason of this resilient condition increases the tendency of any displaced rod to slide down the trough or dale of the crimp of the intersecting rod to resume its original position.

Furthermore, in the event that in the woven fabric 30 of Figures 3 and 4 and 5, there should be any possibility of a lack of registry between complementary crimps, the heat treatment by the process herein described will reform the crimp to ensure such registry.

The screen may then immediately be exposed to a cooling process such as cold air applied immediately after the screen leaves the oven for the purpose of rapidly completing the setting of the crimps in the material and making a permanent set. For this purpose, the now formed screen 40 (Figure 4) may be passed through a slot 41 in a cooling chamber 42 having an intake duct 43 and an outlet 44 for the purpose of admitting cooling gases or other cooling means of any type.

The finished screen 40 is then ready to be utilized as a screen for any of the purposes or uses hereinabove set forth. For the purpose of forming the screening material of the present invention, it is not essential that the rods of nylon from which the screening material is formed be pre-crimped.

As seen in Figure 7, the monofils may be interwoven in the ordinary manner, the weft 51 intersecting with the warp 50 with no attention being paid during the actual weaving process to any crimping which may be needed to obtain the resilient, self-restoring effect hereinabove described.

In this way, the woven result will have a cross-sectional appearance such as that shown in Figure 8 where the monofils merely are interwoven or intermeshed with each other.

In order to obtain the crimped result which is so important to the utility and operation of the present invention, it is necessary merely to pass the woven screen material of Figure 7 and Figure 8 through the heating chamber 32 and the cooling chamber 42 of Figure 4 utilizing for this purpose the same process as that described in connection with Figure 4.

Since the predominant nylon covering material is thermo-sensitive or thermo-plastic, the material is caused by the heat to permanently set in the crimped form which it has obtained as shown in Figure 8 by the weaving process itself.

But not merely does the heat treatment set the nylon in the crimped form shown in Figure 8, but it also causes the nylon material to flow and set without fusing with adjacent strands of nylon about the adjacent strands to produce the final tightly crimped result shown in Figure 9 wherein crimps 24a of hill and dale formation cooperate with complementary crimps on intersecting rods, and since the nylon covering material predominates, the monofils follows the action thereof.

While in the description herein, emphasis has been placed upon nylon, it must be understood that with appropriate changes in temperature and time of operation, any thermo-sensitive, non-metallic, organic, synthetic material may be treated in the same manner to produce exactly the same result.

One of the important characteristics which such material should have is elasticity, the ability to return to the pre-crimped position after it has been tensioned to such an extent as to straighten the crimp out.

At present I prefer nylon as the covering material best suited for this purpose. It has a melting point of approximately 507° F. but is thermoplastic or thermosensitive at a temperature well below this melting point.

Thus in the heating process above described, it may be subjected to a temperature of from anywhere from 120° F. up to its melting point in order to obtain the crimping desired. In suitable instances, the nylon material may be subjected to momentary heat temporarily greatly in excess of the 507° F. melting point without destroying the nylon while at the same time performing the crimping operation above set forth.

The ability of the flexible nylon covered monofils to take a permanent crimp by heat makes possible the production of a very stable screen. If an object is inserted in a mesh opening of the screen, the strands defining the opening can spread, since they are elastic about the crimp, and since the crimp may be temporarily straightened out. But since the strands are permanently corrugated, removal of the object will allow the strands to resume their original position because they will naturally slide into complementary trough to trough engagement with each other.

While in the foregoing description I have emphasized the use of rods of material rather than multi-filament strands, I do not mean by rods any solid, inflexible, thick, elongated piece of material, but rather a length of fiber which essentially is composed of a single connected unitary piece rather than multi-filament fibres twisted or interwoven.

The rods may have the desired thickness for any particular use. The thinnest rod or filament which may be used is one which retains the inherent physical properties of the material above described, that is, one which may be crimped, which will be resilient and elastic and one in which the crimp will be restored upon relaxation of any deforming, distorting or tensioning force exerted thereon. The thickest rod or filament is also one which may be crimped and remain resilient in the manner above described.

The advantages of a thermoplastic, synthetic, organic, non-metallic, elastic material for use in screens over metallic wire materials for use in such screens will be obvious. Taking nylon as an example, it has, under tests, resisted a five per cent solution of sulphuric acid for seven days, a five per cent solution of acetic acid two months, a one per cent solution of sodium hydroxide for two months.

Since nylon has a tensile strength of 51,000 pounds per square inch, a screen made from this material would be at least as strong if not stronger than the ordinary metallic wire screen commercially available at the present time.

It is less subject to the deleterious effects of acids, alkalis and other corrosive substances than any non-precious metallic materials that may be used for screening purposes.

It may be rolled and unrolled without acquiring a permanent set; it may resist weather indefinitely without being harmfully affected in any way; and for all of these reasons is far superior to any metallic wire screen which may be utilized for the same purposes.

The screen, when it is finally formed, may be mounted in any suitable manner. It may be mounted in any molding of any type in a door or window or other frame of any building, building wall, vehicle or other structure. The edges may be bound off or encased by a flexible material of any suitable type as, for instance, the rubber molding 60 which binds the edges of the rubber screen material 40 of Figure 11. Such a rubber or flexible binding molding may well bind the edges against unravelling, may permit flexing or tensioning of the screen in any direction in accordance with the inherent qualities of the screen of the present invention and may be utilized in any case where the screen itself must be flexible or rollable in any way, as for instance, in a rolling window screen.

Such a rubber or other flexible binding or molding for the screen may, when the screen is used in openings of any type provide a gasket like result of such a nature as to weather-proof or wind-proof any opening in which it may be placed.

Owing to the fact that the material forming the screen of the present invention may have all of the properties herein above described and at the same time be substantially transparent and translucent (except for the relatively thin metallic wire core) so that it will be insect and dust-excluding without excluding light, the screen of my invention may have many additional uses which are not open to ordinary wire screens.

In the substantially transparent form, it may well be used in shatter proof glass or as a substitute for the wire mesh or wire reinforced glass.

The field of use for such transparent or translucent screens in vehicles and in front of or instead of or in connection with vehicle openings or windshields is obvious.

In addition, owing to the fact that the material of which the screen of my invention is formed may readily be dyed in any suitable manner, screens formed in accordance with my invention need not be limited to a drab black or to a monotonous single color combination but different strands forming the screen may be colored in different ways to produce geometric designs or patterns coinciding either with the exterior trim or any interior decoration in connection with which it may be used.

Where the wires 10 are of small diameter and the nylon coating is relatively heavy, then the crimping operations may be utilized despite the presence of the wire core and the finished screen will have all of the beneficial and useful results of the crimped screen above described.

Where the wire which forms the core for the nylon is relatively thicker, then the crimping operation may produce a result which tends to nevertheless maintain the stability of the screen, but the essential benefit then derived is mainly the weather-proofed qualities.

It should be understood that the edges of the screen when the screen is finished and cut from the continuous web (if the screen is formed from a continuous web) may be bound off either by a rubber or other flexible binding or molding for the purposes above described or even by a metal or other inflexible binding or molding. And where that is desired, the edges of the screen may be dipped or coated with any suitable plastic or lacquer or any suitable self-setting or cementitious material for binding off or finishing or securing the edges of the screen against unravelling.

Essentially, it may be pointed out that the utilization of the thermo-plastic material as a covering for the wire in the screen permits a setting of the crimp formation which is the essence of my invention, while at the same time the resilience of the covering material imparts to each of the monofil strands the resilience necessary to make adequate use of the crimps. The wire itself forms a foundation or base which may be regarded as imparting added strength to the screen and the covering material, while in itself it has the ordinary construction hereinbefore pointed out, is greatly enhanced in its resistance to physical stresses by reason of the basic wire foundation.

I have found that in ordinary cases with ordinary coverings of the thermoplastic material on my wires, that the wire covered monofils will hold any formation imparted to or assumed by the covering material.

Obviously, the thinner the wire with respect to the thickness of the covering material, the more likely will it be that the ultimate monofil rod thus formed will follow the principles above set forth. As the wire is thickened, then the monofils tend to assume the properties of the wire material rather than of the covering material. In any case, however, the covering material forms a corrosion resistant pleasing outer covering for the wire which in itself is of great importance.

Basically, my invention should not be regarded as one designed simply to increase the tensile strength of the wire core. The primary function is to provide a coating which is weather resistant, not affected by conditions which normally corrode metals, and capable of imparting to the composite monofil structure a resilience which will make the complementary crimping operative to effect a return of the screen to its original form after distortion.

Where it is desired to increase the tensile strength by the use of the nylon coating, it may be necessary to subject the nylon to a stretching process for the purpose of arranging the chain molecules in linear alignment. This process may include a drawing process where slippage or drawing of the periphery surface of the nylon coating can produce the necessary arrangement of the chain molecules without disturbing adhesion to the wire core.

The use of many materials other than nylon and other than polymers of various types including vinyl compounds and other than thermoplastic synthetic resins and other than aldehyde condensation products or cellulose derivatives and other than alsifilm should now be clear to those skilled in the art.

The only element required is that the covering material used be either thermoplastic or thermosensitive; that it be non-metallic and organic and hence not subject to the corrosive effects to which metallic or inorganic materials may be subject and that it be sufficiently elastic to retain a crimp even after tension and that it be sufficiently flexible to permit displacement of individual strands or rolling of the entire screen. Within these limits, any other material may be used in addition to the covering materials above pointed out, or any other material having some of the properties above noted may, for specific purposes, be utilized as effectively as any of the materials above pointed out.

Having now described my invention in its various modifications, I prefer to be limited not by the specific disclosures, but only by the appended claims.

I claim:

1. A composite open mesh screen comprising warp and weft mono-fils; each of said mono-fils comprising a metallic wire coated with a thermally workable synthetic resin of substantial thickness; alternate obtuse crimps in intersecting mono-fils complementarily registering with each other, said mono-fils being resilient at said crimps, said crimps being yieldable to tension exerted upon the mono-fils and being self-restoring upon relaxation of said tension.

2. A composite open mesh screen comprising warp and weft mono-fils; each of said mono-fils comprising a metallic wire coated with a polyamide condensation product of substantial thickness, alternate obtuse crimps in each of said mono-fils, crimps in intersecting mono-fils complementarily registering with each other, said mono-fils being resilient at said crimps, said crimps being yieldable to tension exerted upon the mono-fils and being self-restoring upon relaxation of said tension, said mono-fils being yieldable to mesh distorting forces and being adapted to realign themselves in mesh defining relationship after release of distorting forces.

3. Open mesh flexible and rollable screen material composed of mono-fils of nylon coated metallic wire and said screen comprising heat-set obtusely crimped warp and weft mono-fils, said mono-fils being resilient at said crimps, said crimps being self-restoring after deformation, the trough portions of the crimps in any mono-fil registering with similar trough portions of intersecting mono-fils, complementary crimps being in close frictional relationship with each other.

4. A composite open mesh screen comprising warp and weft mono-fils; each of said mono-fils comprising a metallic wire coated with a thermally workable synthetic resin of substantial thickness, the wire being sufficiently thin in relation to the thickness of the coating so that the properties of the coating material are paramount in the composite material, alternate obtuse crimps in intersecting mono-fils complementarily registering with each other, said mono-fils being resilient at said crimps, said crimps being yieldable to tension exerted upon the mono-fils and being self-restoring upon relaxation of said tension.

5. An open mesh screen comprised essentially of warp and weft mono-fils of substantial thickness each comprising a metallic wire coated with a polyamide condensation product, the wire being sufficiently thin in relation to the thickness of the coating so that the properties of the coating material are paramount in the composite material, alternate permanent obtuse crimps in each of said mono-fils, crimps in intersecting strands complementarily registering with each other, said mono-fils being resilient at said crimps, said crimps being yieldable to tension exerted upon the mono-fils and being self-restoring upon relaxation of said tension, said mono-fils being yieldable to mesh distorting forces and being adapted to realign themselves in mesh defining relationship after release of distorting forces.

HARRY W. THOMAS.